United States Patent
Ponamgi et al.

[11] Patent Number: 6,108,887
[45] Date of Patent: Aug. 29, 2000

[54] METHOD FOR ANALYZING AND MODIFYING A SEQUENCE OF MANUFACTURING OPERATIONS

[75] Inventors: Satyanarayan Rao Ponamgi, Ewing; Gary M. Selzer, Lawrenceville, both of N.J.

[73] Assignee: Lucent Technologies, Inc., Murray Hill, N.J.

[21] Appl. No.: 08/999,840

[22] Filed: Jul. 17, 1997

Related U.S. Application Data

[63] Continuation of application No. 08/408,799, Mar. 23, 1995, abandoned.

[51] Int. Cl.⁷ ..................................................... G06F 15/46
[52] U.S. Cl. ........................................... 29/407.01; 29/705
[58] Field of Search ......................... 29/705, 710, 407.01

[56] References Cited

U.S. PATENT DOCUMENTS

| | | | |
|---|---|---|---|
| 3,040,886 | 6/1962 | Svenson | 29/710 X |
| 4,924,419 | 5/1990 | McIntyre et al. | 29/710 X |

FOREIGN PATENT DOCUMENTS

| | | | |
|---|---|---|---|
| 1285474 | 11/1989 | Japan | 29/705 |
| 2053035 | 2/1981 | United Kingdom | 29/705 |

OTHER PUBLICATIONS

*Sun Computer User Manual* (Nov. 30, 1988), pp. 223–226.

*Primary Examiner*—P. W. Echols

[57] ABSTRACT

A sequence of manufacturing operations performed to manufacture products (22) may be analyzed and modified, as appropriate, by first encoding the operations into tokens, each indicative of a separate operation (and its attributes). The tokens are then assembled into strings, each representing the operations on an individual product. A pattern scanner and recognizer (26) reads each string to recognize whether one or more prescribed token patterns are present. Based on the token patterns that are recognized, a rule is established representing a variation in the sequence of manufacturing operations. After the rule is established, the sequence of manufacturing operations is modified accordingly.

5 Claims, 3 Drawing Sheets

METHOD FOR ANALYZING AND MODIFYING A SEQUENCE OF MANUFACTURING OPERATIONS

This is a continuation of application Ser. No. 08/408,799 filed Mar. 23, 1995, now abandoned.

TECHNICAL FIELD

This invention relates to a technique for analyzing a sequence of operations performed to manufacture like products, and for modifying the sequence, as required, to improve the manufacturing process.

BACKGROUND ART

During its manufacture, an individual product usually undergoes a sequence of operations, some of which may include different tests and or inspections. For example, a complex electronic system may undergo one or more electrical tests, as well as one or more visual inspections during its manufacture. Under ideal circumstances, each manufactured product will pass each test and inspection to which the product has been subjected. Unfortunately, no manufacturing process is ever perfect. Indeed, with very complex products that require a complicated sequence of manufacturing operations, errors do occur during manufacturing, causing one or more products to fail one or more tests/inspections. In some instances, a test/inspection failure may be correctable by a repair. Once repaired, the product is re-tested and re-inspected. If the repair is successful, then the product should pass the previously failed test/inspection. Should the repair be unsuccessful, the product must undergo another repair followed by a subsequent re-test/reinspection.

Some times, the nature of the test/inspection failure will dictate the type of repair that is made. However, in many instances, the test/inspection performed on the product may not provide sufficient information to enable an operator to determine the exact type of repair needed to cure the defect. Thus, an operator undertaking repair of a defective product must further diagnose the product before repairing it, thereby increasing the time, and hence the cost, associated with manufacture of the product. Over time, an experienced operator may learn that a certain repair is more likely to cure a product that has failed a particular test/inspection. Such an operator will likely enjoy a high success rate, which is inversely related to the number of repairs an operator undertakes on a given product to render it operable. Clearly, if all operators had a knowledge of which repairs were likely to be more successful, then the overall repair success rate would increase, thereby decreasing manufacturing costs.

In some instances, a particular sequence of manufacturing operations may yield a defective product even if all of the operations are performed correctly. This is because one of the manufacturing operations may interfere with another owing to the order in which the operations were performed. While the defect may be curable by a repair, it is more desirable to avoiding making any repairs at all. However, for a complex product that undergoes many operations during its manufacture, an improper sequence of operations may not be readily apparent, even to a trained manufacturing engineer.

Thus, there is a need for a technique for analyzing a sequence of manufacturing operations, particularly for the purpose of modifying the sequence to improve the manufacturing process.

BRIEF SUMMARY OF THE INVENTION

Briefly, in accordance with the invention, a technique is provided for analyzing a sequence of operations performed to manufacture products and for automatically modifying the sequence when appropriate. In particular, a method is provided for use in the mass production of a product produced by a sequence of nominal operations which is modified for individual instances of the products in response to tests or inspections. The method is generally characterized by modifying the nominal sequence as a function of the way in which the sequence was modified for an individual product and thereafter, mass producing further instances of the product in accordance with the modified sequence.

In a more detailed manner, the method is practiced by first encoding each operation performed on each individual product into a corresponding token identifying the nature of the operation. Each corresponding attribute associated with each particular operation (in terms of the quantitative or qualitative outcome of that operation) is also encoded into a corresponding token. For example, if the operation is a test or an inspection, the token would be encoded to reflect the type of test or inspection that was performed. A separate token would be encoded to reflect the results of the test or inspection. The tokens are then assembled into a token string for each product in accordance with the sequence of the operations performed on that product. Each token string is read and is thereafter passed to a pattern scanner and recognizer initialized to interpret and analyze the tokens in the string. For example, the pattern recognizer may be initialized to detect one or more tokens or patterns of tokens within each string corresponding to a particular manufacturing operation (i.e., a test or inspection failure) or a sequence of operations satisfying a specified condition. The above-described operations are repeated for a plurality of like products. Once a sufficient number of token strings have been analyzed, then a desired variation in the sequence of manufacturing operations can be established in accordance with the analysis of the token strings. For example, an analysis of the token strings may reveal that a certain sequence of manufacturing operations has a high incidence of failure and thus, it may be desirable to vary the sequence to reduce the incidence of such failures. In accordance with the analysis, the actual sequence of operations is then modified going forward.

The above-described method is of particular value in instances where data regarding the manufacturing process is not complete, some times incorrect or out of sequence, as is often the case with an actual manufacturing process. Thus, the method provides a way of testing an arbitrary token sequence against a pattern representing all valid sequences, allowing selection of valid as well as invalid sequences. Furthermore, it may be the case that most token sequences are not valid. In this case, the above-described method provides a flexible way to make various assumptions and to choose different levels of constraints for the purpose of performing various tasks, including associating a successful repair with a failed test.

DETAILED DESCRIPTION

Figure 1:
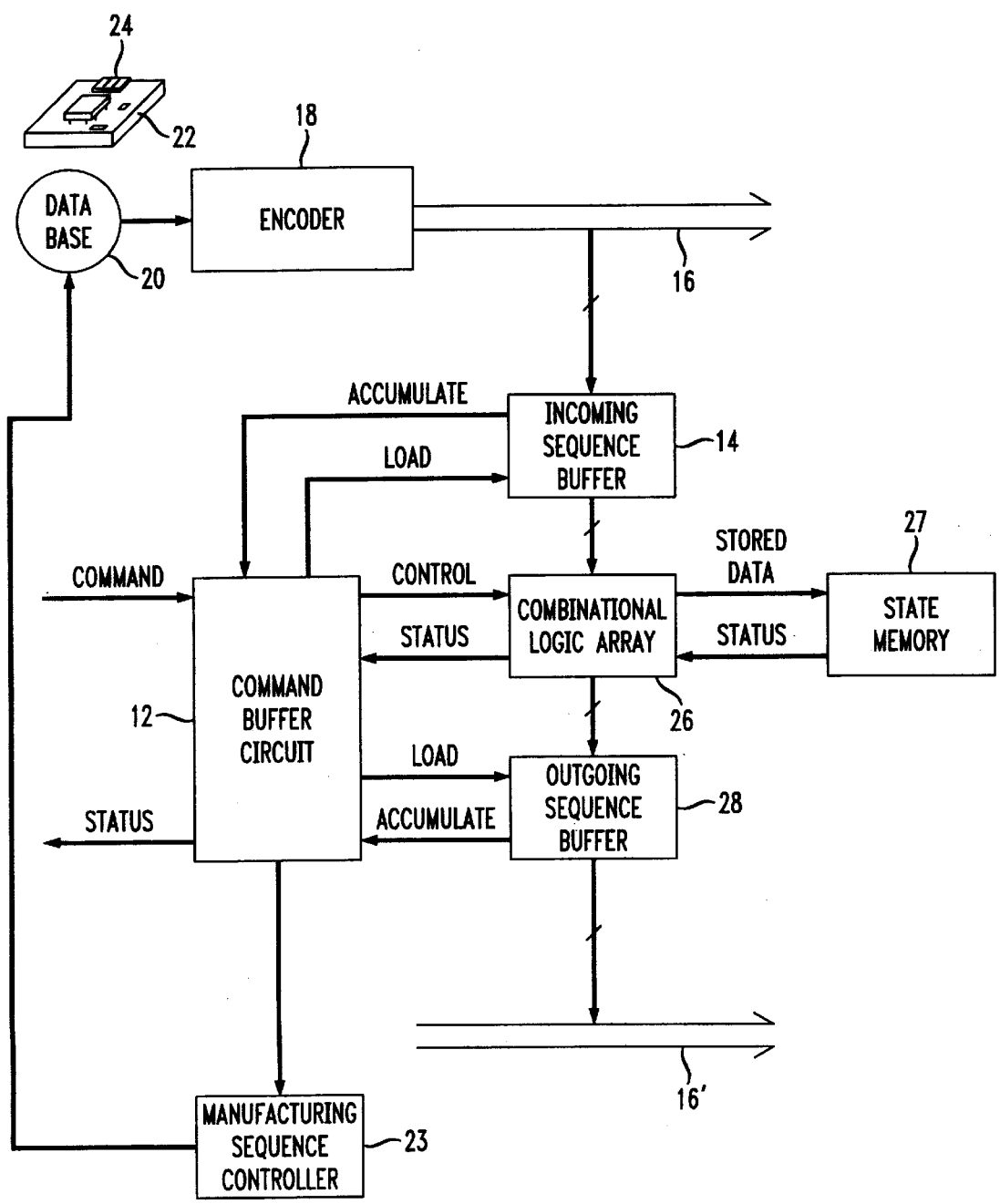
FIG. 1 is a block schematic diagram of an apparatus, in accordance with a first preferred embodiment of the invention, for analyzing and modifying a sequence of manufacturing operations.

FIG. 1 is a block schematic diagram of an apparatus 10, in accordance with a preferred embodiment of the invention, for analyzing a sequence of manufacturing operations and for automatically modifying the sequence as appropriate. The apparatus 10 comprises a command buffer circuit 12, typically a digital computer or a finite state machine, programmed to generate certain commands, and to provide output status information, in response to input commands supplied from an external source (not shown), such as a digital computer, or the like.

The command buffer circuit 12 controls an incoming sequence buffer 14 that is coupled to a data bus 16 supplied with a set of output signals generated by an encoder 18, such as a digital computer or the like. The encoder 18 is coupled to a database 20, typically a mass storage device, such as a magnetic disk drive or the like. The database 20 contains information generated during the manufacture of a plurality of like products 22, each represented by an individual circuit board depicted in FIG. 1. During its manufacture, each product 22 typically undergoes a sequence of manufacturing operations under the control of one or more manufacturing sequence controllers 23 (only one of which is shown in FIG. 1), such as a digital computer or programmable logic controller. For example, when each product 22 comprises a circuit board, each product may undergo the operations of: solder paste application, component placement, solder reflow, electrical testing, and one or more repairs as necessary.

Typically, each product 22 carries unique identifying indicia 24, such as a bar code or the like, that enables the product to be tracked by each manufacturing sequence controller 23 during product manufacture. Thus, each step in the sequence of manufacturing operations performed on each product 22 can be established by reading the bar code 24 of the product each time the product undergoes one of the operations in its manufacturing process. The identity of the product, together with the nature of each operation performed on the product (and the attributes of each operation), are recorded in the database 20. Thus, the database 20 contains information regarding each test/inspection performed on each product 22, as well as the outcome of that test/inspection.

The encoder 18 encodes the information contained in the database 20 into tokens, each representing a manufacturing operation performed on a given product 22, together with the attributes of that operation. In addition to encoding the data into tokens, the encoder 18 further assembles the tokens into strings, each string representing the sequence of operations performed on an individual product. Within each string, the tokens are arranged in accordance with the sequence of operations performed on the product.

To better appreciate the manner in which the encoder 18 encodes the tokens and assembles them into strings, assume that each product 22 of interest is a circuit board, and that each board undergoes a bias test (b), a tune test (t) and a final test (f) during manufacture. Further, assume that each such test is independent of the other so that each product 22 may pass or fail each test independently. If a particular product 22 has passed the bias, tune and final tests, then the encoder 18 would encode and then assemble the following token string:

bPtPfP

As may be appreciated the letter P following each of the tokens b, t and f represents the attribute (i.e., a passing result) for each test.

Not every product 22 passes the bias, tune and final tests on the first try. A given product 22 may fail one or more tests several times. As an example, a product 22 may have one of the following token strings associated with it:

bPtFtFtFtFtPfFfFfP     (2)

bFbFbPtPfFfFfP     (3)

bPtFrltPfFfFfrfP     (4)

The letter F after each test indicates that the product failed that test. The token rl in the token string (4) represents a particular repair operation performed on the product 22 to remedy the defect or defects that caused the product to fail the tune test. Note that the token strings (1)–(4) are only exemplary. Many other variations are possible.

Each successive token string output by the encoder 18 on the bus 16 is stored in the incoming sequence buffer 14 in response to a LOAD instruction received by the buffer from the command buffer circuit 12. Once loaded with a token string, the incoming sequence buffer 14 generates an ACCUMULATE signal for receipt by the command buffer circuit 12 to signal the command buffer circuit that a successive token string has been received (loaded) in the buffer.

The incoming sequence buffer 14 has its output coupled to the input of a combinational logic array 26 that is controlled by the command buffer circuit 12. The details of an illustrative embodiment of the combinational logic array 26 will be described hereinafter with respect to FIG. 2. As will become better appreciated by reference to FIG. 2, the combinational logic array 26 is capable of recognizing a prescribed pattern of tokens, either a whole token string or a portion thereof The command buffer circuit 12 establishes the pattern of tokens to be recognized by the combinational logic array 26 by initializing the array with an appropriate CONTROL signal that specifies the token pattern to be recognized. For example, it may be desirable to determine the frequency (i.e., the number of occurrences) of the token pattern tF rl tP for the purpose of determining the effectiveness of the repair operation rl in terms of rendering the product capable of passing the tune test t. Thus, under such circumstances, the combinational logic array 26 would be initialized to "recognize" only the tokens tF rl tP within each token string passed from the incoming sequence buffer 14. With the combinational logic array 26 so initialized, a token string comprising the tokens bPtFrltFfF would not be recognized by the array.

It should be understood that string tF rl tP is a simple "degenerate" pattern capable of being recognized by the combinational logic array 26. Indeed, real power of the instant technique is the ability to recognize patterns specifying many fixed strings by the use of a pattern specifying a regular expression. For example, it may be of interest to ascertain whether a token string contains the token tF succeeded by the token t P without regard to whether or not any tokens are present between them. To recognize such an occurrence, the combinational logic array 26 would be initialized to first recognize if the token tF was present, and, if so, to recognize whether any of the succeeding tokens corresponded to the token tP. Thus, the advantage of the present technique is its ability to recognize patterns specifying many different fixed strings.

Referring to FIG. 1, the combinational logic array 26 has an associated memory 27 that stores information from the array in the form of the signals STORED DATA. Such STORED DATA signals contain information as to the number and type of token strings recognized by the combinational logic array 26. Following receipt of information from the combinational logic array 26, the memory 27 provides the array with information, in the form of the signals STATUS, indicating that the information was received. Although not shown, the state memory 27 is typically coupled to the command buffer circuit 12 or to an external device (i.e., a digital computer) for providing it with data indicative of number and type of the tokens recognized by the combinational logic array 26.

In some instances, it may be desirable to detect the presence of a variety of different token string patterns beyond the capability of the single combinational logic array 26. For this reason, an outgoing sequence buffer 28 is provided to temporarily store the token string analyzed by the combinational logic array 26 prior to placing the token string on a bus 16' for subsequent input to another pattern scanner and recognizer of the type thus far described. In this way, the token strings may be processed in a "pipeline" fashion to achieve timely analysis thereof.

Figure 2:
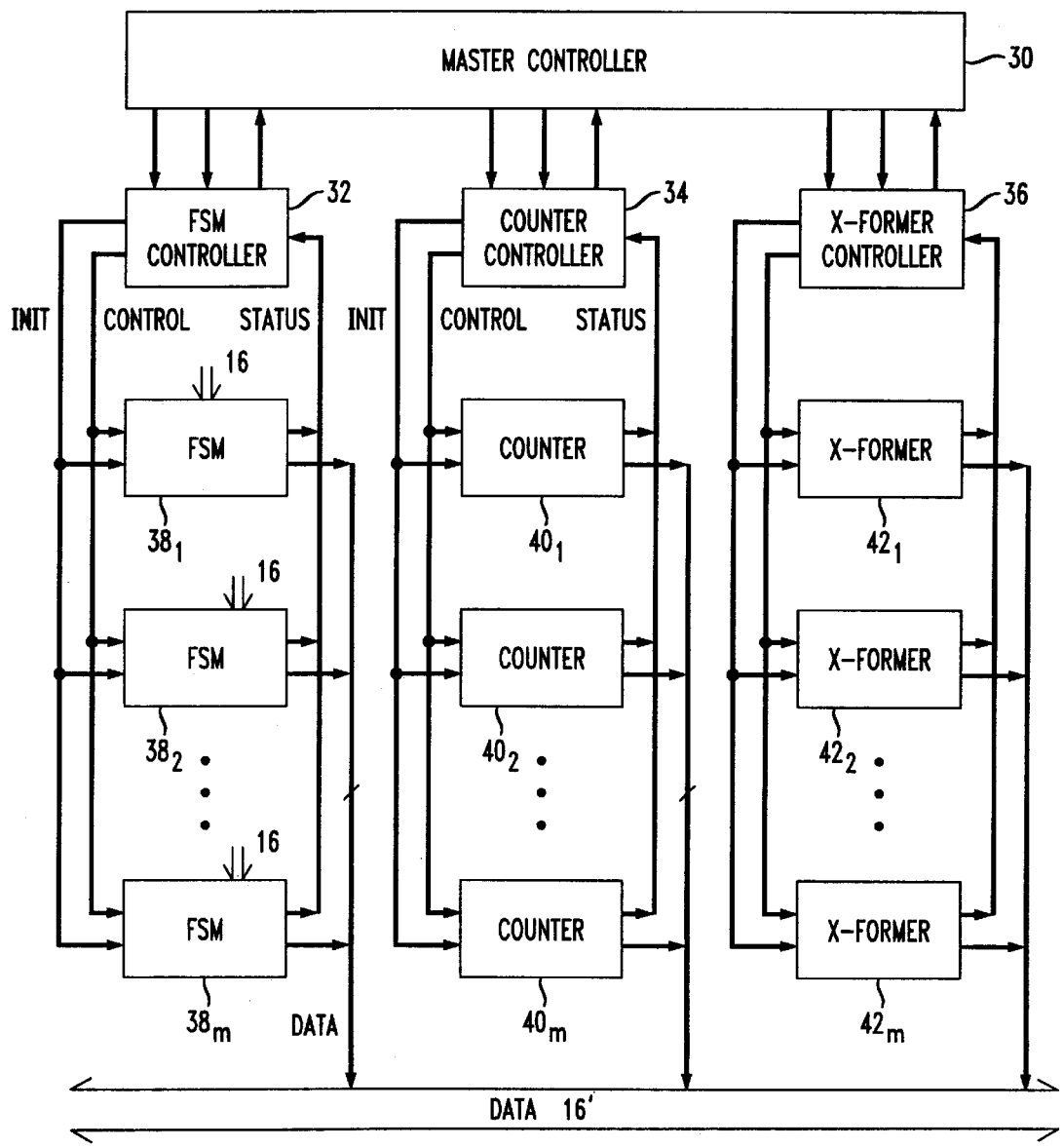
FIG. 2 is a block schematic diagram of combinational logic array comprising a portion of the apparatus of FIG. 1.

FIG. 2 illustrates a block schematic diagram of an illustrative embodiment of the combinational logic array 26. As depicted in FIG. 2, the combinational logic array 26 includes a master controller 30, typically a microprocessor or microcomputer, for controlling a Finite State Machine (FSM) controller 32, a counter controller 34 and a string transformer ("X-former") controller 36. The master controller 30 controls the FSM controller 32, the counter controller 34 and X-former controller by providing each one with initialization (INIT) and control signals (CONTROL) and for receiving status information (STATUS) therefrom. The FSM controller 32 comprises a sequencer, such as a programmed logic array, for controlling a bank of Finite State Machines (FSMs) $38_1, 38_2 \ldots 38_n$, where n is an integer>0. Each of the FSMs $38_1, 38_2 \ldots 38_n$ is initialized in response to an initialize command (INIT) from the FSM controller 32 to recognize a particular pattern of tokens in a token string received by that FSM from the data bus 16. Once initialized, the FSMs $38_1, 38_2 \ldots 38_n$ are sequenced by the FSM controller 32 in response to control commands (CONTROL) so that the FSMs examine a string of tokens in a desired sequence. For example, it may be desirable for a particular token string to be analyzed first by the FSM $38_1$, then by the FSM $38_n$ before being analyzed by FSM $38_2$. Other sequences are possible.

Once each of the FSMs $38_1, 38_2 \ldots 38_n$ has recognized a particular pattern of tokens, that FSM provides a status signal (STATUS) to the FSM controller 32 to alert the controller of this event. The status information is utilized by the FSM controller 32 to enable the FSMs $38_1, 38_2 \ldots 38_n$ to be sequenced again to analyze another string of tokens. After each FSM has analyzed a token string, the string is placed on the data bus 16'.

Associated with each of the PSMs $38_1, 38_2 \ldots 38_n$ is an individual one of a plurality of counters $40_1, 40_2 \ldots 40_n$. Each of the counters $40_1, 40_2 \ldots 40_n$ is initialized in response to initialization signals (INIT) from the counter controller 34, typically comprised of a sequencer similar to the FSM controller 32. Once initialized, the counters $40_1, 40_2 \ldots 40_n$ are controlled by the counter controller 34 in response to control commands (CONTROL) so each counter counts the number of token string patterns recognized by a corresponding one of the FSMs $38_1, 38_2 \ldots 38_n$, respectively. Each of the counters $40_1, 40_2 \ldots 40_n$ provides the counter controller with status information (STATUS) indicative of the counter's operation. Further, each of the counters $40_1, 40_2 \ldots 40_n$ is coupled to the data bus 16' for placing its count on the bus.

The X-former controller 36 comprises a sequencer, like the FSM and counter controllers 32 and 34, for controlling a bank of string transformers (X-formers) $42_1, 42_2 \ldots 42_n$, each associated with a separate FSM. Each of the X-formers $42_1, 42_2 \ldots 42_n$ functions to transform the token string analyzed by an individual one of the FSMs $38_1, 38_2 \ldots 38_n$. In its simplest form, each X-former may include a comparator (not shown) and a register (not shown). The comparator within the X-former would compare the token string analyzed by the corresponding FSM to a prescribed pattern and if a match is found, then the register would output a token string representing the desired transformation. The X-formers $42_1, 42_2 \ldots 42_n$ are initialized in response to initialization signals (INIT) from the X-former controller and are controlled in response to control signals from the X-former controller to operate in the same sequence as the sequence of FSM controllers $38_1, 38_2 \ldots 38_n$. Each X-former provides the X-former controller 36 with status information (STATUS) indicative of the token string transformation it has performed and also provides the transformed string on the data bus 16'.

Figure 3:
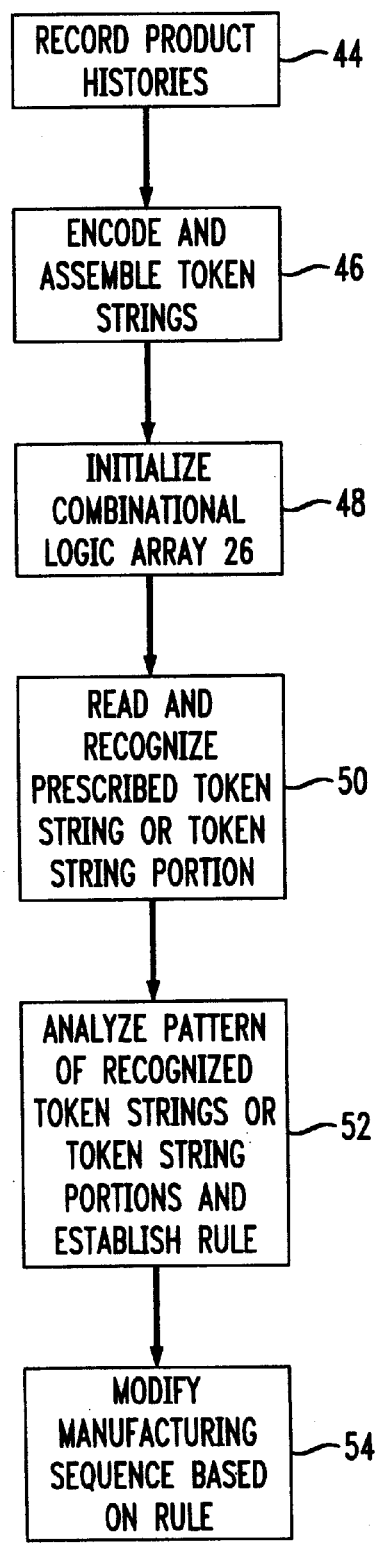
FIG. 3 is a flowchart diagram generally depicting the operations executed by the apparatus of FIG. 1 to analyze and modify a sequence of manufacturing operations.

The overall operation of the apparatus 10 may best be understood by reference to FIG. 3 that depicts a flowchart of the operations undertaken to analyze the sequence of operations performed to manufacture the product 22 and to modify the sequence when appropriate. The overall method depicted in FIG. 3 is begun by recording the history of each product 22 (step 44). As discussed previously, each time the product 22 undergoes a separate manufacturing step, the step, together with its attributes, is recorded in the database 20 of FIG. 1.

Following step 44, step 46 is executed and the product histories stored in the database 20 of FIG. 1 are encoded into tokens by the encoder 18 of FIG. 1, and the tokens are assembled into strings. As discussed previously, the encoder 18 encodes the history of each product 22 by generating tokens, each comprising one or more alphanumeric characters and representing a specific step in the sequence of manufacturing operations performed on each product, as well as the attributes for that step. Also during step 46, the tokens are assembled into strings, each token string representing the sequence of manufacturing operations performed on an individual product 22. In practice, the tokens in each string are assembled based on the chronological sequence of operations performed on each product. However, it may be desirable to assemble the tokens in a different manner. For instance, it may be desirable to assemble the tokens in terms of the geographic sequence of operations.

Step 48 follows step 46. During step 48, the combinational logic array 26 of FIG. 1 is initialized in accordance with a set of external control signals (COMMANDs) to recognize at least one pattern of tokens. The particular pattern of tokens to be recognized by the combinational logic array 26 depends on the desired analysis of the product histories. As discussed, if the product histories are to be analyzed to determine the effectiveness of a particular repair operation, then the combinational logic array 26 would be initialized to recognize the presence of the token associated with that repair, followed by the token associated with a test/inspection (and its attribute) indicating the effectiveness of the repair. Although step 48 has been described as succeeding step 46, the combinational logic array 26 could easily be initialized prior to recording the product histories (step 44), or prior to encoding and assembling the token strings (step 46).

After the combinational logic array 26 has been initialized, then step 50 is executed and each token string is successively read by the array to recognize the prescribed token string or portion thereof. As discussed earlier, such reading is accomplished by loading the token string into the incoming sequence buffer 14 and thereafter transferring the token stored in the buffer into the combinational logic array 26. Upon receiving (reading) the token string from the incoming sequence buffer 14, the combinational logic array 26 proceeds to "recognize" a prescribed token string (or portion thereof). The combinational logic array 26 recog nizes a prescribed token string (or portion thereof) by matching each token string received from the incoming sequence buffer 14 to the prescribed pattern of tokens established by initializing the array. Each time a match occurs, information concerning the match (i.e., the signals STORED DATA) is sent to the state memory 27.

Following step 50, step 52 is executed, During step 52, the recognized patterns of tokens are then analyzed, either by the command buffer circuit 12, or by an external device (not shown) such as a digital computer for the purpose of establishing a rule (i.e., a change in the sequence of manufacturing operations). In the simplest case, where a single string portion is of interest, the analysis may involve nothing more than counting the number (frequency) of such single string portions that were recognized. In some instances, the analysis may require determining the frequency at which several different patterns occurred. In a complex case the analysis will determine if the operation sequence is in accordance with a rule specified by an arbitrary sequence transition diagram.

The rule that is established depends on the analysis of the patterns of tokens. To appreciate the manner in which the rule is established, assume that the combinational logic array 26 of FIG. 1 was initialized during step 48 to look for the token patterns tF rl tP and tF rl tF . The purpose in recognizing each of these two patterns is to determine the effectiveness of the repair operation rl to cure a product defect that caused a tune failure (tF) . If the frequency of the string portions tF rl tP greatly exceeds the frequency of the string portions tF rl tF , then it follows that the repair operation rl would be more likely than not to cure a tune failure tF . Thus, a rule would be established that the repair operation rl should be undertaken first following a tune failure.

Following step 52, the manufacturing sequence is modified during step 54 in accordance with the previously established rule. For example, in the event that a rule is established that a repair operation rl be undertaken following a tune failure, then the manufacturing sequence controller 23 would be alerted to vary the manufacturing process, for example, by causing a product 22 to be diverted following a tune failure to a repair station at which the repair operation rl could be completed.

The foregoing discloses a technique for analyzing a sequence of manufacturing operations and for modifying the sequence as appropriate. In accordance with the invention, there is provided a method for mass producing a product via the performance of a nominal sequence of operations that is modified in response to the results of one or more inspections and/or tests. The method is characterized by modifying the nominal sequence of operations as a function of the way in which the sequence was modified for one or more individual instances of the product. For example, the sequence may be modified by adding an operation (say a repair following a certain operation) deleting an operation, or modifying the sequence of operations. Thereafter, the product is mass produced in further instances in accordance with the modified sequence.

It is to be understood that the above-described embodiments are merely illustrative of the principles of the invention. Various modifications and changes may be made thereto by those skilled in the art which will embody the principles of the invention and fall within the spirit and scope thereof. For example, while the apparatus 10 of FIG. 1 has been described in terms of separate hardware elements, it should be appreciated that the operations of: (a) encoding the manufacturing operations into tokens, and (b) processing the tokens to recognize if at least one prescribed pattern is present, could easily be performed by a single digital computer programmed in accordance with the principles of the invention.

What is claimed is:

1. A method for use in the mass production of a product that is produced by the performance of a nominal sequence of manufacturing operations, the sequence being modified for individual instances of said product in response to the results of at least one inspection or test performed during production, the method comprising the steps of:

modifying the nominal sequence of manufacturing operations to create a new sequence of manufacturing operations for an individual instance;

analyzing a plurality of modified nominal sequences of manufacturing operations used to produce a corresponding plurality of individual instances of the product using a data processor; and mass producing further the products in accordance with a new nominal sequence of manufacturing operations as a function of the way in which the nominal sequence was modified for an individual instance of the product.

wherein the step of analyzing a plurality of modified sequences of manufacturing operations comprises the steps of:

(a) encoding each of a plurality of manufacturing operations of a modified sequence that are performed on an individual instance of a product into respective tokens indicative of the operations and their attributes;

(b) assembling a plurality of tokens into a token string;

(c) processing the token string to determine if the token string contains a predetermined pattern; and (d) repeating steps (a)–(c) for a plurality of instances of the product.

2. The method according to claim 1, wherein the step of modifying the nominal sequence of manufacturing operations comprises the steps of:

establishing a rule representing a variation in the nominal sequence of manufacturing operations based on whether the token strings contain a predetermined pattern; and modifying the nominal sequence of manufacturing operations to create a new sequence of manufacturing operations based on the established rule.

3. The method according to claim 1, wherein the tokens are assembled in accordance with the chronological order in which the manufacturing operations are performed on each product.

4. The method according to claim 1, wherein the step of processing the token string comprises the steps of:

initializing at least one pattern scanner to determine if a predetermined pattern of tokens exists in a token string;

loading the pattern scanner with the assembled token string; and processing the token string with the pattern scanner to determine if the predetermined pattern of tokens exists in the token string.

5. The method according to claim 1, wherein the step of processing the token string further comprises the step of processing the token string a second time to determine if the token string contains a second predetermined pattern.

\* \* \* \* \*